(12) United States Patent
Yang

(10) Patent No.: US 10,798,354 B2
(45) Date of Patent: Oct. 6, 2020

(54) PROJECTION DISPLAY APPARATUS AND METHOD FOR CONTROLLING THE SAME

(71) Applicant: DELTA ELECTRONICS, INC., Taoyuan (TW)

(72) Inventor: Chung-Yi Yang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/358,724

(22) Filed: Mar. 20, 2019

(65) Prior Publication Data

US 2019/0297308 A1 Sep. 26, 2019

Related U.S. Application Data

(60) Provisional application No. 62/645,195, filed on Mar. 20, 2018.

(30) Foreign Application Priority Data

Nov. 19, 2018 (CN) .......................... 2018 1 1375974

(51) Int. Cl.
*H04N 9/31* (2006.01)
*H04N 7/01* (2006.01)
*H04N 13/398* (2018.01)

(52) U.S. Cl.
CPC ......... *H04N 9/3188* (2013.01); *H04N 7/0127* (2013.01); *H04N 13/398* (2018.05)

(58) Field of Classification Search
CPC ... H04N 9/3188; H04N 13/398; H04N 7/0127
(Continued)

(56) References Cited

U.S. PATENT DOCUMENTS 6,316,974 B1 11/2001 Taraci et al.
7,097,311 B2 8/2006 Jaynes et al.
(Continued)

FOREIGN PATENT DOCUMENTS

CN 106094409 A 11/2016
CN 106878631 A 6/2017
(Continued)

OTHER PUBLICATIONS

Ken Bylsma, Can you explain in detail how e-Shift works?, http://usjvc.com/faq/index.php?action=artikel&cat=20&id=268&artlang=en, Apr. 29, 2014.
(Continued)

*Primary Examiner* — Zaihan Jiang
(74) *Attorney, Agent, or Firm* — CKC & Partners Co., LLC

(57) ABSTRACT

A projection display apparatus includes a first operating mode, a second operating mode, a processing circuit, a control circuit, an imaging device and a shifting device. The processing circuit receives an input video signal, the input video signal includes an input video feature, the control circuit selectively switches the projection display apparatus to the first operating mode or the second operating mode according to the input video feature or the operating condition, the imaging device receives the first output video signal and outputs a plurality of first output video images corresponding to the first output video signal, and the imaging device is further configured to receive the second output video signal and output a plurality of second output video images corresponding to the second output video signal.

18 Claims, 12 Drawing Sheets

(58) Field of Classification Search
USPC .................................................. 375/240.26
See application file for complete search history.

(56) References Cited

U.S. PATENT DOCUMENTS

| | | | | |
|---|---|---|---|---|
| 2003/0174161 | A1* | 9/2003 | Wilburn | G06F 3/1423 715/730 |
| 2005/0185139 | A1 | 8/2005 | Yamanaka et al. | |
| 2008/0204548 | A1* | 8/2008 | Goulanian | G02B 27/2214 348/51 |
| 2008/0278582 | A1* | 11/2008 | Chung | H04N 7/18 348/159 |
| 2009/0244048 | A1 | 10/2009 | Yamanaka | |
| 2010/0110285 | A1* | 5/2010 | Nobori | H04N 19/172 348/384.1 |
| 2010/0165168 | A1* | 7/2010 | Takahashi | H04N 9/3182 348/333.1 |
| 2011/0013151 | A1* | 1/2011 | Nagahara | G02B 15/177 353/101 |
| 2011/0181520 | A1* | 7/2011 | Boda | G06F 1/1639 345/173 |
| 2011/0181846 | A1* | 7/2011 | Ozawa | H04N 9/3185 353/70 |
| 2012/0184364 | A1* | 7/2012 | Loose | G07F 17/34 463/25 |
| 2013/0176216 | A1* | 7/2013 | Ichieda | G06F 3/033 345/157 |
| 2014/0285483 | A1 | 9/2014 | Yamanaka | |
| 2014/0293247 | A1 | 10/2014 | Abe et al. | |
| 2015/0029223 | A1* | 1/2015 | Kaino | G09G 3/002 345/633 |
| 2016/0205341 | A1* | 7/2016 | Hollander | G06T 7/20 375/240.08 |
| 2016/0360125 | A1* | 12/2016 | Yamamoto | A61B 1/06 |
| 2017/0099484 | A1 | 4/2017 | Mashitani et al. | |
| 2018/0061301 | A1 | 3/2018 | Hu et al. | |

FOREIGN PATENT DOCUMENTS

| | | |
|---|---|---|
| CN | 108696732 A | 10/2018 |
| JP | 2005-241870 A | 9/2005 |
| JP | 2008-271413 A | 11/2008 |
| JP | 2009-118159 A | 5/2009 |
| JP | 2015-5974 A | 1/2015 |
| JP | 2017-72828 A | 4/2017 |
| JP | 2018-72383 A | 5/2018 |
| TW | I231401 B | 4/2005 |
| TW | I331740 B | 10/2010 |

OTHER PUBLICATIONS

JVC'S Extreme 4K Image Quality, http://eu.jvc.com/microsite/eu/dla-x9000/feature01.html, 2015 JVCKENWOOD Corporation.

* cited by examiner

PROJECTION DISPLAY APPARATUS AND
METHOD FOR CONTROLLING THE SAME

RELATED APPLICATIONS

This application claims priority to U.S. Provisional Application Ser. No. 62/645,195, filed Mar. 20, 2018, and China Application Serial Number 201811375974.2, filed Nov. 19, 2018, the disclosures of which are incorporated herein by reference in their entireties.

BACKGROUND

Field of Invention

The present of the disclosure relates to a projection display apparatus and a method for controlling the same. More particularly, the present disclosure relates to a projection display apparatus with multiple display modes and a method for controlling the same.

DESCRIPTION OF RELATED ART

With the advancement of the display apparatus industry, display requirements for large-scale applications often require the highest display resolution, such as 4K (3840× 2160) or even 8K (7680×4320) projection display requirements. In addition to the display resolution, the frame rate of the video also affects the quality of motion picture. In order to increase the smoothness of motion picture, a common method is to perform motion estimation and insert processed frames on the original input video signal. Depending on the needs of the actual application, higher resolution is more important for some applications, while higher frame rates is more important for other applications. However, high resolution and high frame rates are often not able to be both achieved due to bandwidth constraints. Further, an ordinary user may not understand the effects of resolution and frame rate to their specific application/use. Therefore, it is desirable to have a more intelligent and automated high-end projector system which can select and tune its operating resolution and frame rate to achieve higher results.

SUMMARY

One aspect of the present disclosure is a projection display apparatus. The projection display apparatus includes a first operating mode, a second operating mode, a processing circuit, a control circuit, an imaging device and a shifting device. The first operating mode and the second operating mode are configured to operate the projection display apparatus in an operating condition. The processing circuit is configured to receive an input video signal, wherein the input video signal includes an input video feature, wherein in the first operating mode, the processing circuit converts the input video signal and outputs a first output video signal, and wherein in the second operating mode, the processing circuit converts the input video signal and outputs a second output video signal. The control circuit is coupled to the processing circuit, and the control circuit is configured to selectively switch the projection display apparatus to the first operating mode or the second operating mode according to the input video feature or the operating condition. The imaging device is configured to receive the first output video signal and output a plurality of first output video images corresponding to the first output video signal, and the imaging device is further configured to receive the second output video signal and output a plurality of second output video images corresponding to the second output video signal, wherein the imaging device includes a first display resolution. The shifting device is coupled to the imaging device, wherein in the first operating mode, the shifting device cooperates with the imaging device to effect a projection of a projecting image to a screen, wherein the projecting image includes a second display resolution greater than the first display resolution.

Another aspect of the present disclosure is a control method. The method includes: receiving, by a processing circuit, an input video signal comprising an input video feature; selectively switching the projection display apparatus, by a control circuit, to a first operating mode or a second operating mode according to the input video feature or an operating condition of the projection display apparatus, wherein if switched to the first operating mode: converting, by the processing circuit, the input video signal and outputting a first output video signal; receiving, by an imaging device, the first output video signal and outputting a plurality of first output video images corresponding to the first output video signal, wherein the imaging device includes a first display resolution; shifting, by a shifting device cooperating with the imaging device, the plurality of first output video images; and projecting, to a screen, a projecting image corresponding to the plurality of first output video images, wherein the projecting image includes a second display resolution greater than the first display resolution, and wherein if switched to the second operating mode, converting, by the processing circuit, the input video signal and outputting a second output video signal; receiving, by an imaging device, the second output video signal and outputting a plurality of second output video images corresponding to the second output video signal.

DETAILED DESCRIPTION

Although embodiments are described in detail with the accompanying drawings, they are not intended to limit the scope of the present disclosure. Moreover, the operation of the described structure does not limit the order of implementation. Any device with equivalent functions configured by different combinations of disclosed elements is intended to be covered by the scope of the present disclosure. Drawings are for the purpose of illustration only, and not plotted in accordance with the original size.

It will be understood that when an element is referred to as being "connected to" or "coupled to", it can be directly connected or coupled to the other element or intervening elements may be present. In contrast, when an element to another element is referred to as being "directly connected" or "directly coupled," there are no intervening elements present. As used herein, the term "and/or" includes an associated listed items or any and all combinations of more.

Figure 1:
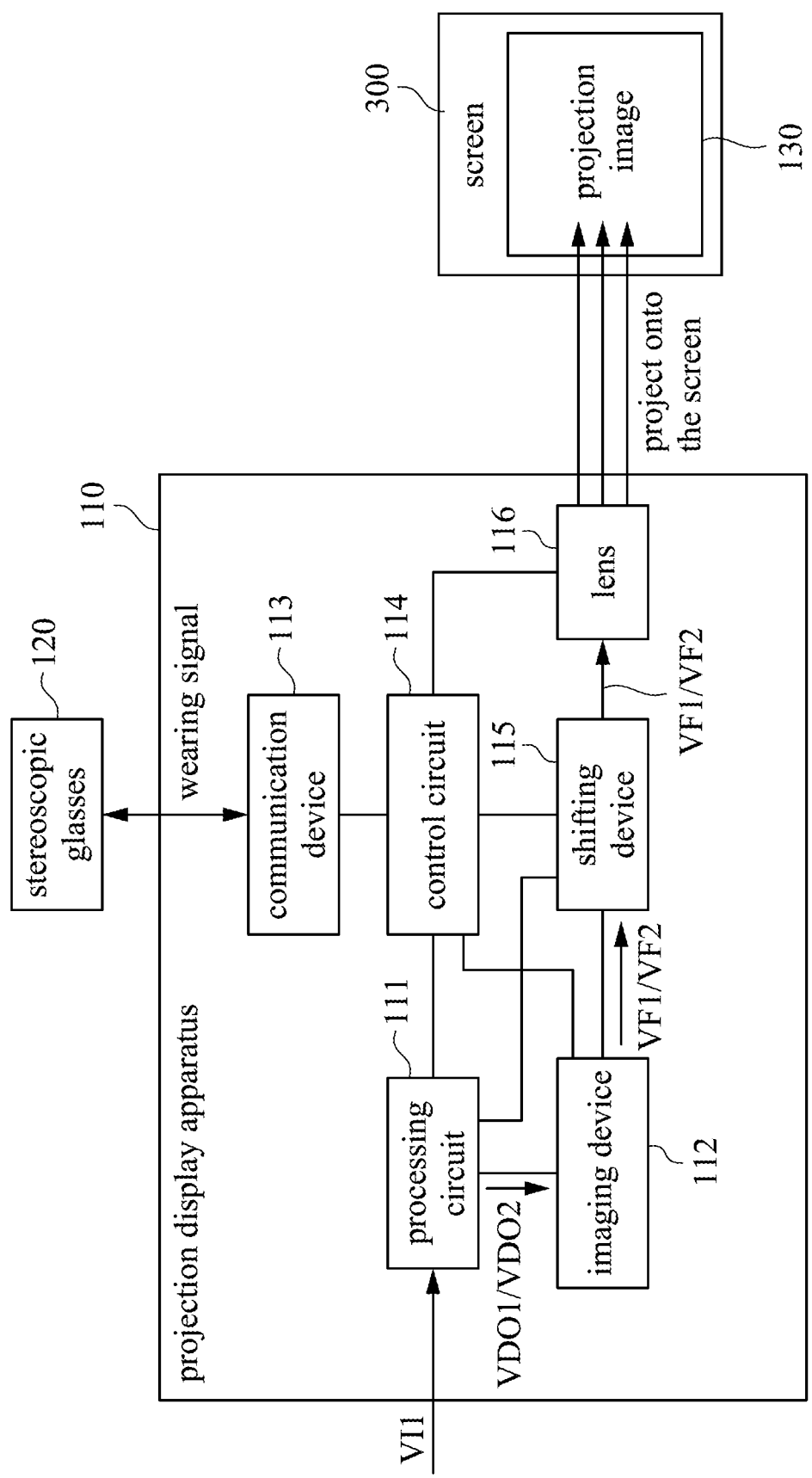
FIG. 1 is a function block diagram of a projection display apparatus according to an embodiment of the present disclosure.

Referring to FIG. 1, a projection display apparatus 110 is shown which includes a processing circuit 111, an imaging device 112, a communication device 113, a control circuit 114, a shifting device 115, and a lens 116. The processing circuit 111 is electrically coupled to the imaging device 112, the control circuit 114 and the shifting device 115. The control circuit 114 is electrically coupled to the processing circuit 111, the imaging device 112, the communication device 113, the shifting device 115 and the lens 116. In an embodiment, the processing circuit 111 may be a processor such as a scaler, an image processor or FPGA. The communication device 113 may be a component of various protocol interfaces (wired or wireless), a wireless communication chip, and/or other component with communication function for receiving a wearing signal of a stereoscopic glasses 120 and transmitting the stereoscopic left/right eye synchronization signals to the stereoscopic glasses 120. The control circuit 114 may be a central processor or a microprocessor. The implementation and connection of the devices and components in the projection display apparatus 110 are not limited to the above described, and any connection method and implementation method suitable for the projection display apparatus 110 to implement the following technical contents can be applied to the present case.

Figure 2:
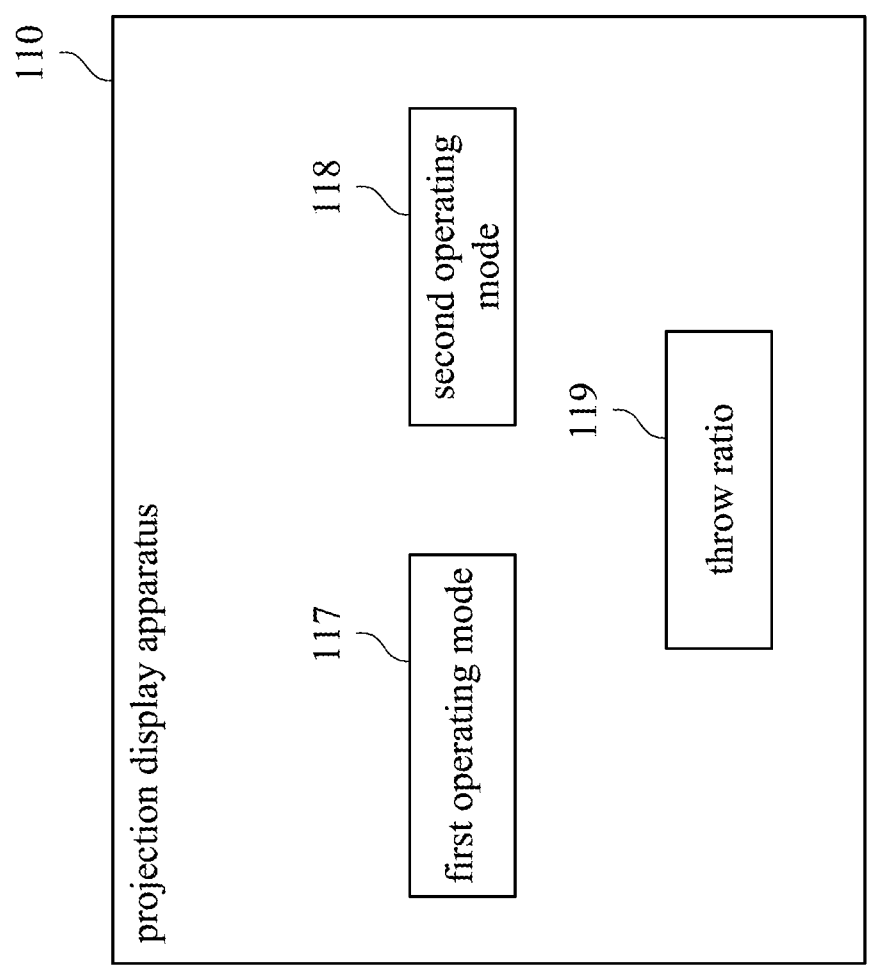
FIG. 2 is a system setting representation of a projection display apparatus according to an embodiment of the present disclosure.

Referring to FIG. 1 and FIG. 2, a projection display apparatus 110 is shown which includes a first operating mode 117 and a second operating mode 118. The operating modes may be set to a high resolution mode or a high frame rate mode. The projection display apparatus 110 further includes a throw ratio 119, which is generally defined as the projection distance divided by the width of the projected image for representing the length of the focal length of the projection lens, and the throw ratio can be manually set or automatically detected. The focal length of the projection lens can be changed by changing the lens, or be adjustable such as by manually adjusting the lens or electrically adjusting by the projection display apparatus 110 (e.g., controlled by the control circuit 114). When the focal length of the projection lens has been changed, the throw ratio 119 of the projection display apparatus 110 can be correspondingly updated.

In an embodiment, the processing circuit 111 receives an input video signal VI1, and the input video signal VI1 includes an input video feature. The input video feature may include examples such as input video clocking and display timing information, input video resolution, input video format (e.g., stereoscopic image format) or compression indicator such as if it is in a compressed format, etc. In some embodiments, the control circuit 114 selectively switches the projection display apparatus 110 to the first operating mode 117 or the second operating mode 118 according to the input video feature or an operating condition of the projection display apparatus 110. In another embodiment, the control circuit 114 selectively switches the projection display apparatus 110 to the first operating mode 117 or the second operating mode 118 according to a priority order set by the projection display apparatus 110 (e.g., shown in FIG. 7 to FIG. 12). The projection display apparatus 110 can preferentially determine whether to switch to the first operating mode 117 or the second operating mode 118 according to the input video feature, or preferentially according to the operating condition, or according to the priority order set by the projection display apparatus 110. A more detailed determination and selection process is described later.

In an embodiment, the imaging device 112 may have a native resolution of 3840×2160, which is also referred to as 4K resolution. In some applications, the input video signal VI1 may provide an image resolution greater than the native resolution of the imaging device 112. For example, the input video signal VI1 may provide an input image of 8K (7680× 4320) resolution. In general, when the resolution of the input image is greater than the native resolution of the imaging device, the projection display apparatus can only exhibit effect to the level of the native resolution. In an embodiment of the present disclosure, the projection display apparatus 110 can switch to a particular operating mode according to the feature of the input video signal VI1 (e.g., resolution of the input video signal).

For example, when the projection display apparatus 110 is switched to the first operating mode 117, the processing circuit 111 converts the input video signal VI1 to a first driving output video signal VDO1 which is input into the imaging device 112. The imaging device 112 has a first display resolution (e.g., 4K, 3840×2160), and the imaging device 112 receives the first drive output video signal VDO1 and images the first output video image VF1 to the shifting device 115. The shifting device 115 cooperates with the imaging device 112 to cause a projection image 130, having a second display resolution (e.g., 8K, 7680×4320) that is greater than the first display resolution (e.g., aforementioned 4K), to be projected onto a screen 300. By this way, the projection display apparatus 110 with a lower native resolution can be operated to present a higher-resolution-equivalent output image. A more detailed process is described later.

In some applications, the resolution of the input image may not be greater than the native resolution of the projection display apparatus 110. In this circumstance, it is not necessary to increase the display resolution of the projection display apparatus 110 to display the input image resolution. Also, in some applications, displaying a higher resolution image does not enhance the viewing experience, and therefore it is not desirable to increase the display resolution of the projection display apparatus 110. For example, in an embodiment of the present disclosure, the projection display apparatus 110 can determine to select a particular operating mode better suited for 3D viewing according to the feature of the input video signal VI1 (e.g., if the input video signal has a stereoscopic format).

The projection display apparatus 110 can switch to the second operating mode 118, wherein the processing circuit 111 converts the input video signal VI1 to a second driving output video signal VDO2. The imaging device 112 receives the second driving output video signal VDO2 and images the second output video image VF2 to the shifting device 115. The shifting device 115 does not engage, and the second output video image VF2 is directly projected onto the screen 300 via the lens 116.

Figure 3:
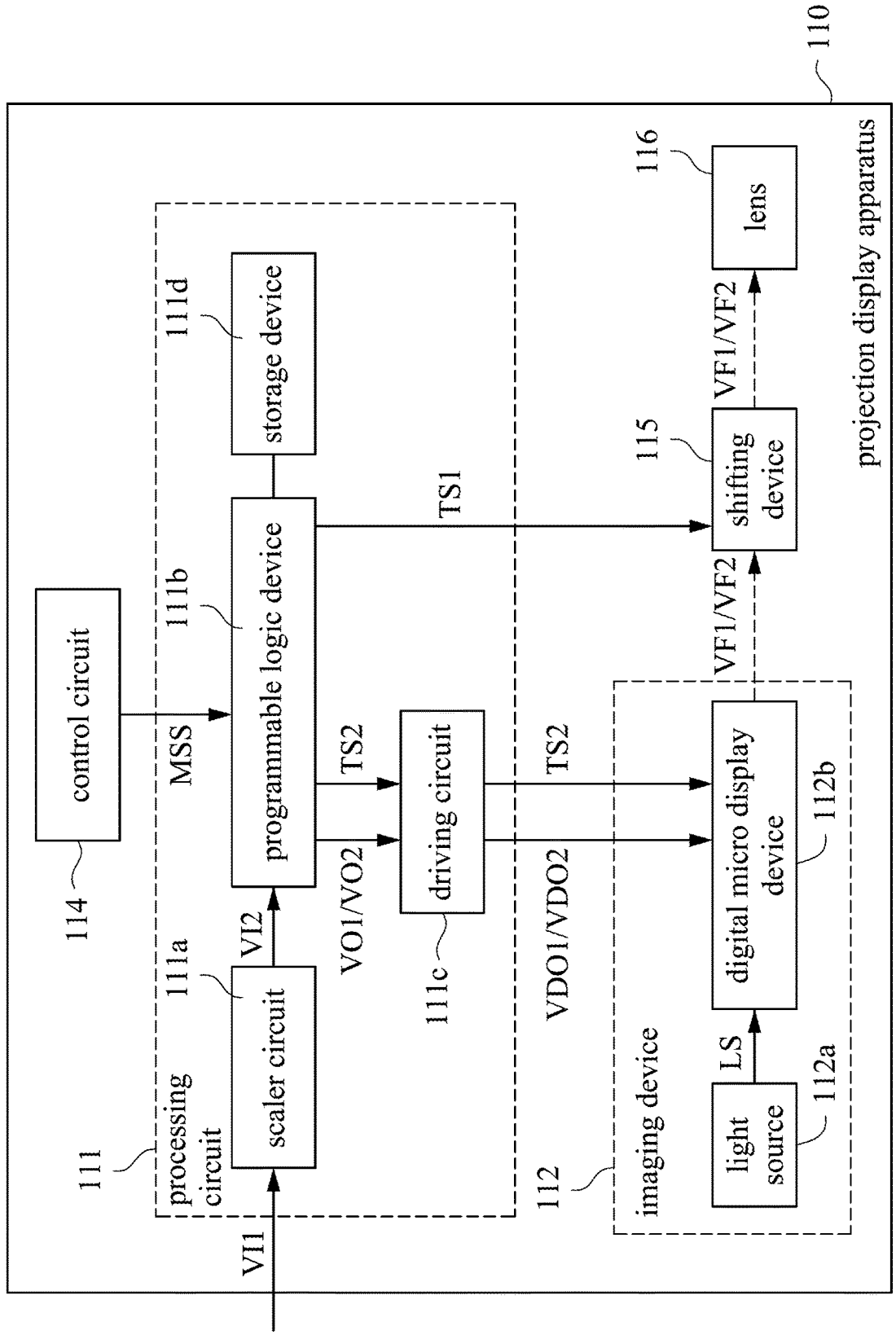
FIG. 3 is a partial circuit diagram of a projection display apparatus according to an embodiment of the present disclosure.

Referring to FIG. 3, a projection display apparatus 110 is shown which includes a processing circuit 111, a control circuit 114, an imaging device 112, a shifting device 115 and lens 116. The processing circuit 111 includes a scaler circuit 111a, a programmable logic device 111b, a driving circuit 111c and a storage device 111d. The imaging device 112 includes a light source 112a and a digital micro display device 112b. The scaler circuit 111a adjusts the input image specifications to the image specifications of the projection display apparatus 110. For example, the scaler circuit 111a can adjust a 4:3 or 16:10 projection aspect ratio input signal to a 16:9 projection aspect ratio of the projection display apparatus 110. The scaler circuit 111a adjusts the input video signal VI1 to generate an input video signal VI2.

According to an input video feature of the input video signal VI2 or an operating conditions of the projection display apparatus 110, the control circuit 114 transmits a mode switching signal MSS to the programmable logic device 111b. The mode switching signal MSS can be a signal indicating the selection of, and setting the projection display apparatus 110 to, the first operating mode 117. After receiving the mode switching signal MSS, the programmable logic device 111b converts the input video signal VI2 and outputs the first output video signal VO1, a clock signal TS1 and another clock signal TS2. The programmable logic device 111b transmits the clock signal TS1 to the shifting device 115 and also transmits the clock signal TS2, which is another synchronized clock signal, to the imaging device 112 via the driving circuit 111c.

The driving circuit 111c converts the first output video signal VO1 to a first driving output video signal VDO1 and outputs it to the digital micro display device 112b. In this embodiment, the first output video signal VO1 sent by the programmable logic device 111b to the driving circuit 111c may include image data such as color, brightness, and the like, of a plurality of pixels in each frame of a video stream (e.g., jpeg, bmp, gif, tiff or other picture or image storage format). The driving circuit 111c converts the first output video signal VO1 to a control signal format required by the digital micro display device 112b. In practical applications, the digital micro display device 112b includes a mirror matrix composed of a plurality of reflective mirrors, each of which can rotate at a very high speed, and the angle of rotation has two states, respectively representing the instantaneous brightness of each pixel in the picture. The ratio of bright time and dark time determines the brightness of each pixel in the picture. The driving output video signal VDO1 converted by the driving circuit 111c can be used to control the state and timing of rotation of the mirror. For example, if the ratio of bright time and dark time of the rotation state of one pixel is 50%-50%, the screen will be 50% brightness. That is, the first driving output video signal VDO1 processed by the driving circuit 111c can be used to drive the timing of the mirror matrix in the digital micro display device 112b to a desired rotation state. The digital micro display device 112b projects a display image to a projection optical path by the light LS emitted by a light source 112a and other optical components (not shown), and the display image on the digital micro display device 112b is projected onto the screen 300 via the shifting device 115 and the lens 116.

Figure 4:
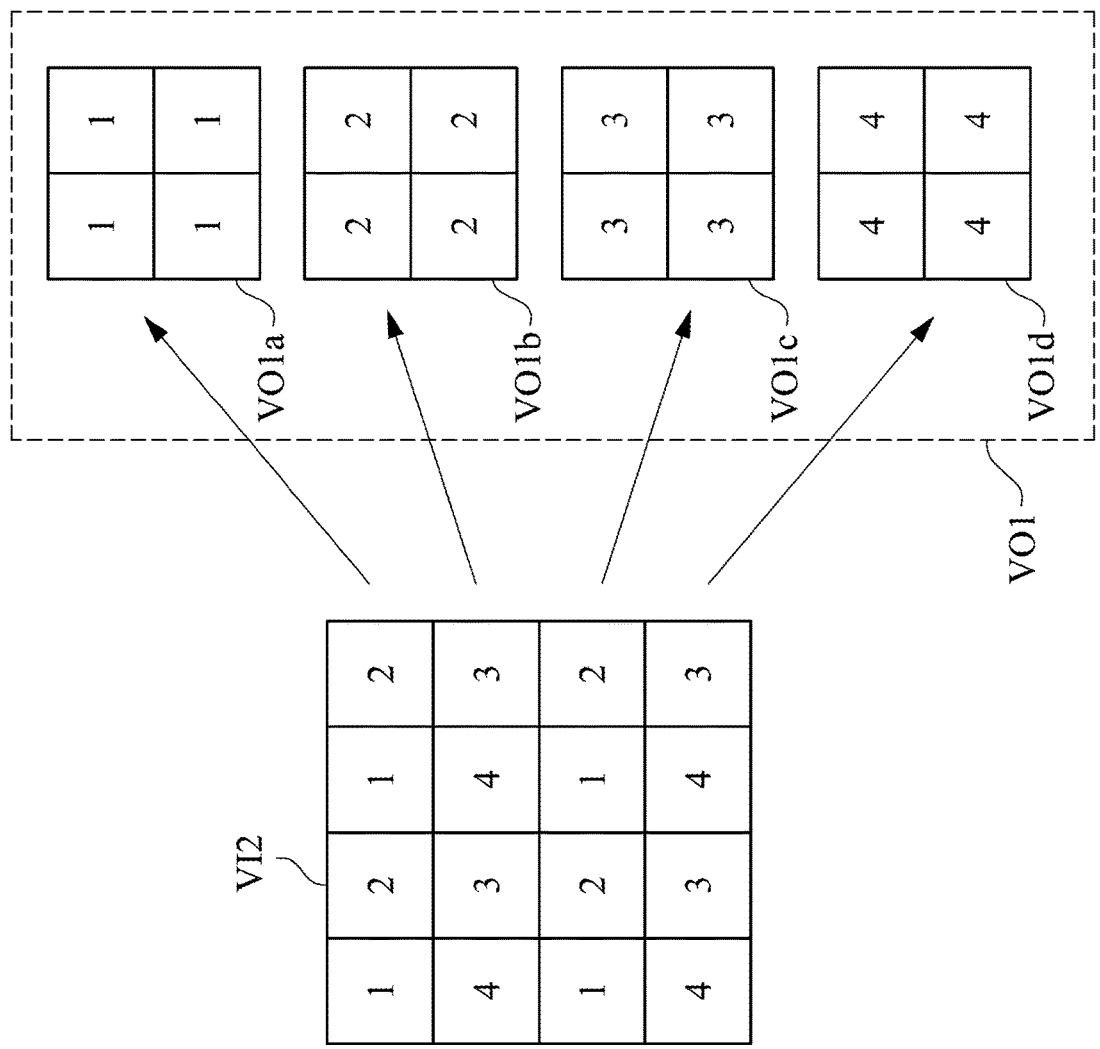
FIG. 4 is a schematic diagram of a converting method of an input video signal according to an embodiment of the present disclosure.

Referring to FIG. 4, in the first operating mode 117, the programmable logic device 111b converts the input video signal VI2 into a first output video signal VO1, and the first output video signal VO1 includes a first sub-image VO1a, a second sub-image VO1b, and a third sub-image VO1c and a fourth sub-image VO1d. Using a 4×4 example, FIG. 4 shows an exemplary conversion method in which the 16 pixel points of the input video signal VI2 are equally divided into four pixel regions such as an upper left pixel region, an upper right pixel region, a lower left pixel region and a lower right pixel region. The four pixel points of each pixel region are divided into four pixel blocks such as an upper left pixel block, an upper right pixel block, a lower left pixel block, and a lower right pixel block. The pixels of the same pixel block in the four pixel regions combine into a new sub-picture. In this embodiment, for convenience of description, the pixel points of the same pixel block are denoted by the same number, and the four pixel points of the first sub-image VO1a is composed of the upper left pixel block of the four areas of the first output video signal VO1 (numbered as 1); the second sub-image VO1b is composed of the upper right pixel block (numbered as 2); the third sub-image VO1c is composed of the lower right pixel block (numbered as 3); and the fourth sub-image VO1d is composed of the lower left pixel block (numbered as 4).

Using the abovementioned technology, the projection display apparatus realizes an image whose output resolution is greater than the native resolution of the projection device, by cooperation of the digital micro display component and the shifting device.

The programmable logic device 111b may be a field programmable gate array (FPGA), a programmable array logic (PAL), a generic array logic (GAL), or a complex programmable logic device (CPLD), or any other equivalent programmable logic devices. The digital micro display device 112b may include a matrix of a plurality of micro mirrors and using a micro switch for adjusting the micro mirrors.

The shifting device 115 is set up to operate cooperatively with the digital micro display device 112b. In an embodiment, the shifting device 115 may include the mirrors with two sets of voice coil motors. One set of the voice coil motors may be set up to shift the projected image of the digital micro display device 112b in a first axial direction (for example, up and down along a vertical axis). Another set of the voice coil motors may be set up to shift the projection image of the digital micro display device 112b in a second axial direction (for example, left and right along a horizontal axis). The disclosure is not limited thereto, and the two sets of the voice coil motors are not limited to move along the vertical and horizontal axes, but may also move along other distinct axial directions, for example, along +45 degrees and −45 degrees. Further, the movement is not limited to biaxial, and may also be uniaxial to shift the projection image in one axial direction. In an embodiment, the shifting device 115 may also include a set of voice coil motor for shifting the projected image of the digital micro display device 112b along a single axis. In an embodiment, the shifting device 115 can include multiple sets of voice coil motors that shift the projected image of the digital micro display device 112b along different axes.

Figure 5:
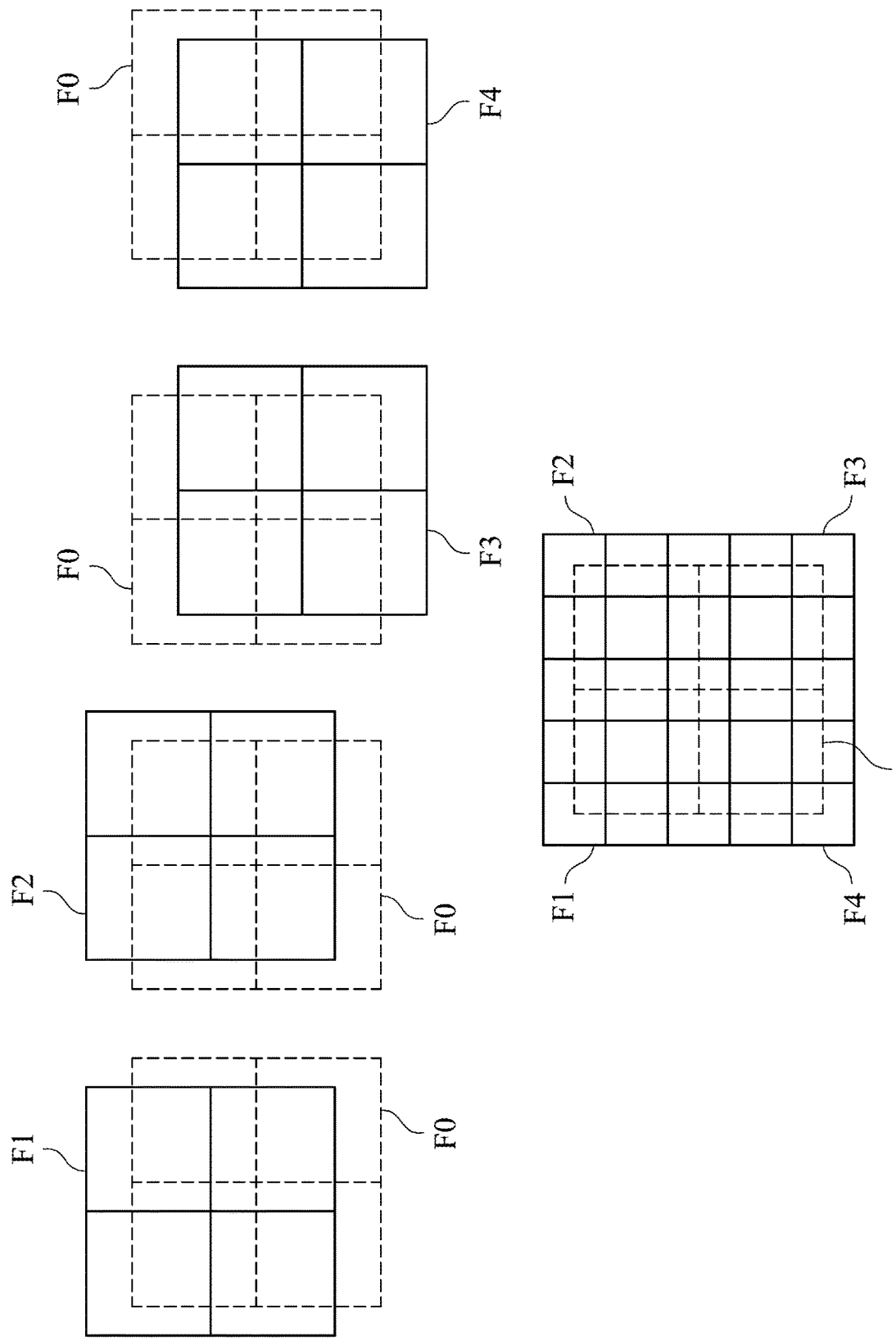
FIG. 5 is a schematic diagram of a shifting method of a video image according to an embodiment of the present disclosure.

Referring to FIGS. 3-5, FIG. 3 shows a clock signal TS2 for controlling the switching of the imaging screen 300 of the digital micro display device 112b and a clock signal TS1 for controlling the shifting direction of the shifting device 115. FIG. 5 shows an original image F0 being the original image of the first output video signal V01. As shown in FIG. 3, the programmable logic device 111*b* transmits two synchronized signals, clock signals TS1 and TS2, to the shifting device 115 and the digital micro display device 112*b* in the imaging device 112, respectively. In this way, the shifting device 115 and the digital micro display device 112*b* can together control the display of the image according to the synchronized signals, clock signals TS1 and TS2. When the image displayed by the digital micro display device 112*b* is switched between the first sub-image VO1*a*, the second sub-image VO1*b*, the third sub-image VO1*c*, and the fourth sub-image VO1*d*, the shifting device 115 can synchronously move the image projected by the digital micro display device 112*b* to the upper left, upper right, lower right, and lower left, as shown in FIG. 5.

For example, at the first time the programmable logic device 111*b* controls the shifting device 115 to bi-axially shift to an upper left position. The programmable logic device 111*b* transmits the clock signal TS1 to the shifting device 115 to drive the shifting device 115 to perform the above operation. The shifting device 115 may include two bi-axial voice coil motors, one of which shifts the projected image of the digital micro display device 112*b* to the left by ¼ pixel width, and another one simultaneously shifts the projected image of the digital micro display device 112*b* upward by ¼ pixel width. According to the driving of the clock signal TS2, the first sub-image VO1*a* is imaged on the digital micro display device 112*b*, and the light LS projected by the light source 112*a* causes a first position image F1 to form through the digital micro display device 112*b*. In this embodiment, the clock signal TS1 which controls the shifting device 115 and the clock signal TS2 which controls the digital micro display device 112*b* are synchronized with each other to drive the shifting device 115 and the digital micro display device 112*b* at the same time.

Next, at the second time, according to the clock signal TS1 transmitted by the programmable logic device 111*b* to the shifting device 115, the shifting device 115 is controlled to bi-axially shift to an upper right position. At this time, the digital micro display device 112*b*, which receives the clock signal TS2 synchronized with the clock signal TS1, changes the imaged content from the first sub-image VO1*a* to the second sub-image VO1*b* according to the clock signal TS2. The light LS projected by the light source 112*a* causes a second position image F2 to form through the digital micro display device 112*b*. By synchronization of the clock signals TS1 and TS2, the shifting of the shifting device 115 and the imaging content of the digital micro display device 112*b* are simultaneously actioned.

At the third time, according to the clock signal TS1 transmitted by the programmable logic device 111*b* to the shifting device 115, the shifting device 115 is controlled to bi-axially shift to a lower right position. At this time, the digital micro display device 112*b*, which receives the clock signal TS2 synchronized with the clock signal TS1, changes the imaged content from the second sub-image VO1*b* to the third sub-image VO1*c* according to the driving of the clock signal TS2. The light LS projected by the light source 112*a* causes the third position image F3 to form through the digital micro display device 112*b*.

At the fourth time, according to the clock signal TS1 transmitted by the programmable logic device 111*b* to the shifting device 115, the shifting device 115 is controlled to bi-axially shift to a lower left position. Similar to the above described operation, at this time, the light LS projected by the light source 112*a* causes a fourth position image F4 to form through the digital micro display device 112*b*.

The first position image F1, the second position image F2, the third position image F3 and the fourth position image F4 partially overlap with each other as shown in FIG. 5. The four images overlap to become a first output video image VF1 for displaying on a screen 300 through the lens 116. When the frequency of the shift as described above is greater than the time that human eyes can react, the displayed image is perceived as having a higher resolution than the original image F0.

Returning to FIG. 3, according to an example embodiment, when the programmable logic device 111*b* receives the mode switching signal MSS having indications for setting the projection display apparatus 110 to the second operating mode 118, the shifting device 115 does not start the above described shifting process. The programmable logic device 111*b* accesses data for the image to be displayed by using the storage device 111*d* to obtain a second output video signal VO2 and to obtain a frame rate greater than the input video signal VI2. The second output video signal VO2 is imaged as the second output video image VF2 via the digital micro display device 112*b* for displaying on a screen 300 through the lens 116. Accordingly, the projection frame rate of the plurality of the second output video images VF2 is greater than the frame rate of the input video signal VI2. In an embodiment, the storage device 111*d* may be a frame buffer used to temporarily store the image data. Through reading and writing of the frame buffer, the images to be displayed are arranged for output to achieve a high frame rate projection display.

In other words, according to embodiments of the present disclosure, the first operating mode 117 is set to a high resolution mode, and the second operating mode 118 is set to a high frame rate mode.

Figure 6:
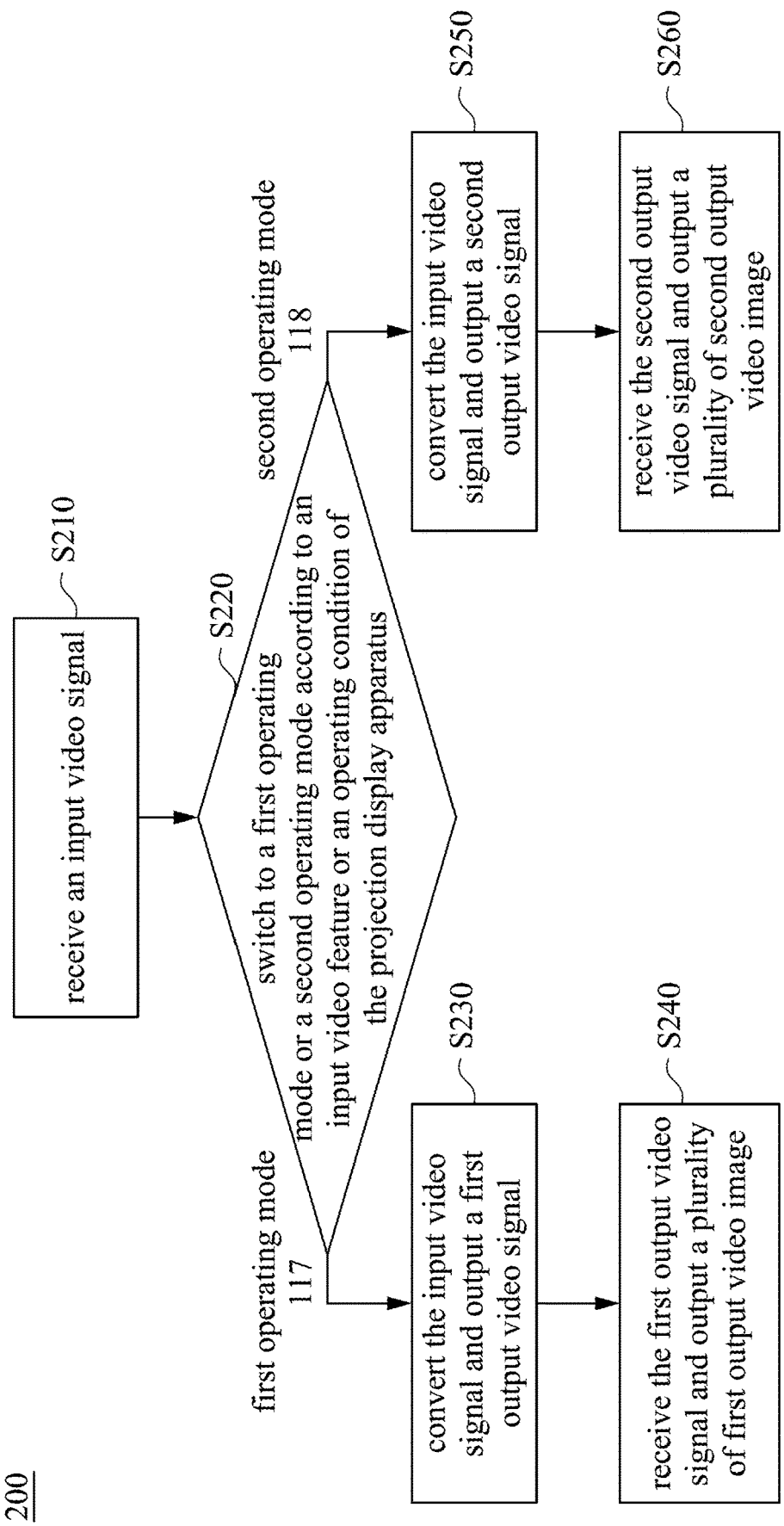
FIG. 6 is a flow chart of a control method according to an embodiment of the present disclosure.

FIGS. 6 to 12 show flow charts of control methods according to embodiments of the present disclosure. Referring to FIG. 6, for control method 200, at step S210, an input video signal is received, and step S220 determines to switch to the first operating mode 117 or the second operating mode 118 according to an input video feature or an operating condition of the projection display apparatus 110. If switching to the first operating mode 117, then the process goes to step S230. At step S230, an input video signal VI2 is converted and output as a first output video signal VO1. Next, at step S240, the first output video signal VO1 is received and a plurality of first output video images VF1 is output. If switching to the second operating mode 118, the process goes to step S250. At step S250, an input video signal VI2 is converted and output as a second output video signal VO2. Next, at step S260, the second output video signal VO2 is received and a plurality of second output video images VF2 is output. According to embodiments of the present disclosure, the first operating mode 117 may be set to a high resolution mode and the second operating mode 118 may be set to a high frame rate mode. Examples of determination method are described below.

FIG. 7 to FIG. 12 show steps S220*a* to S220*f* as different embodiments of the determination step S220 in FIG. 6.

Figure 7:
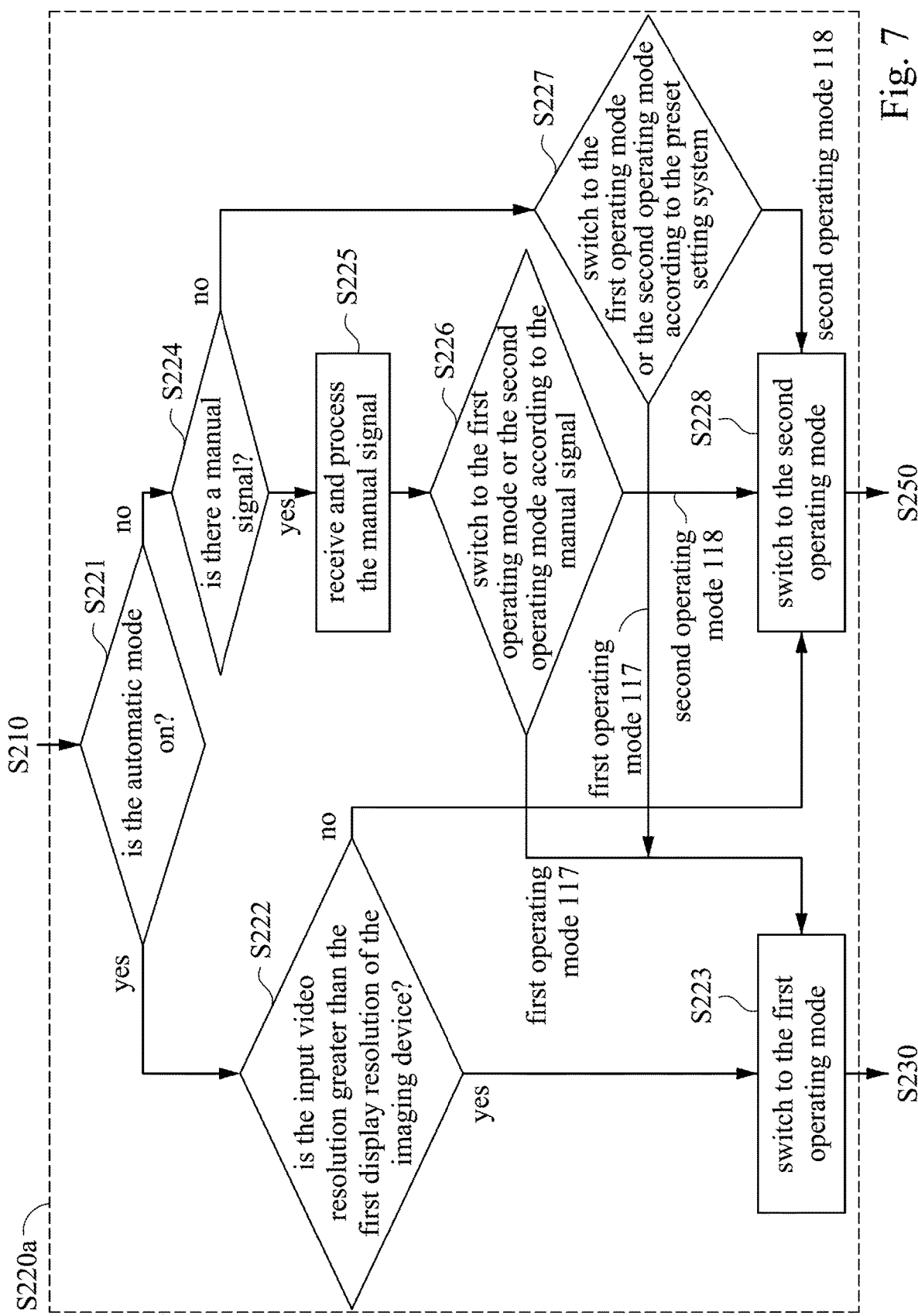
FIG. 7 is a flow chart of further steps included in step S220 in the control method of FIG. 6 according to some embodiments.

Referring to the embodiment shown in FIG. 7, following step S210, step S221 determines if an automatic mode is enabled, and if yes, then proceed to step S222. At step S222, if the resolution of the input video is greater than the display resolution (first display resolution) of the imaging device 112 of the projection display apparatus 110 is determined, then the image to be viewed can be regarded as a high-resolution image. Since the projection display apparatus 110 would need to support an increased resolution, the process goes to step S223 to switch the projection display apparatus 110 to a first operating mode 117 (high resolution mode). If the resolution of the input video is not greater than the display resolution of the imaging device 112, then the process proceeds to step S228 which switches the projection display apparatus 110 to a second operating mode 118 (high frame rate mode). Referring back to the determination step S221, if the automatic mode is not on, then proceed to step S224 which determines if there is a manual control signal indicating which operating mode to select. The presence of a manual control signal likely means that a user wants to assert a manual control. If there is no manual control the process proceeds to step S227 which the projection display apparatus 110 is switched to the first operating mode 117 or the second operating mode 118 according to the projection display apparatus' preset system setting. If there is a manual control signal at step S224, then at step S225, the projection display apparatus 110 receives and processes the manual control signal. At step S226, according to the received manual control signal, a determination is made to switch to the first operating mode 117 (step S223) or to the second operating mode 118 (step S228).

Figure 8:
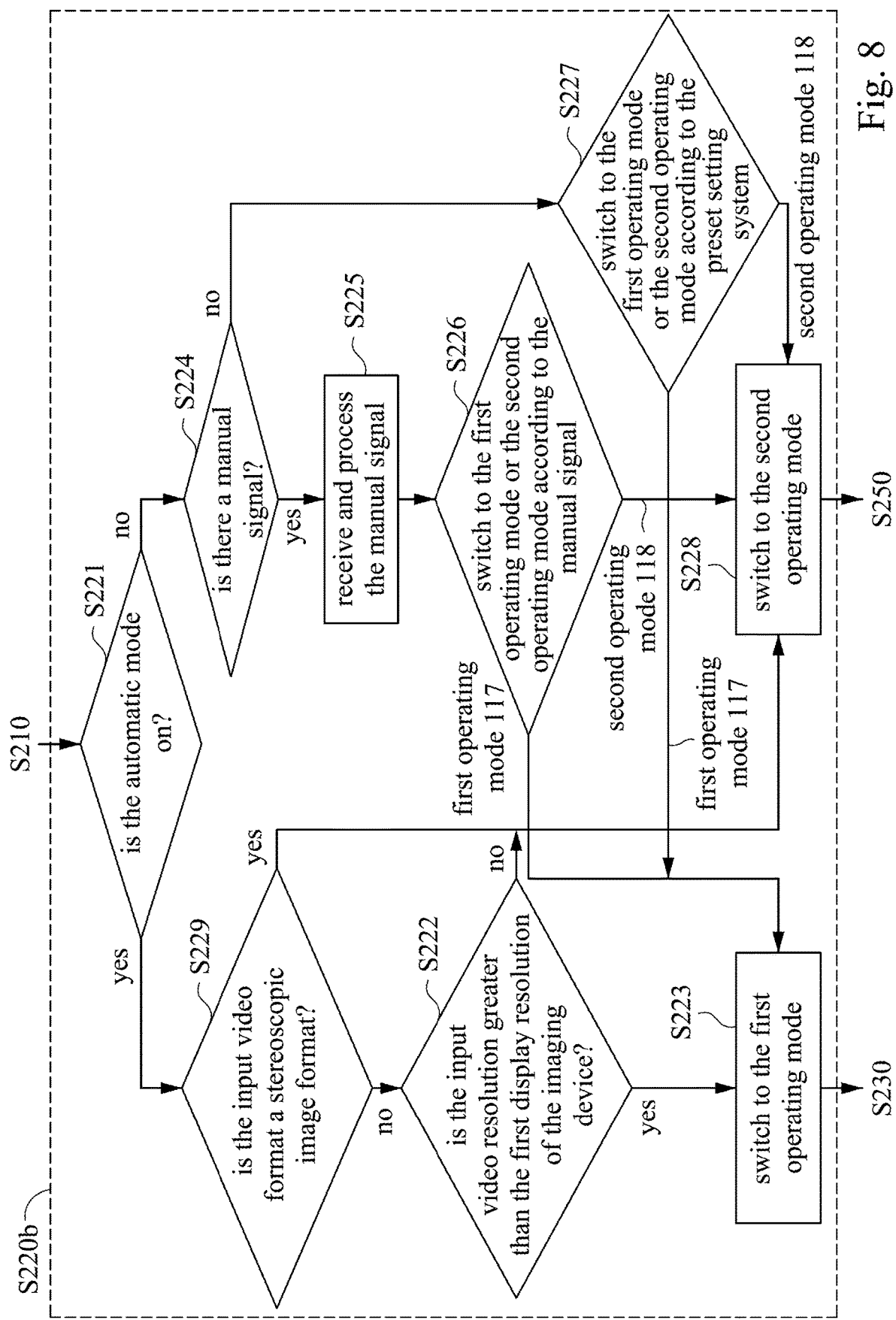
FIG. 8 is a flow chart of further steps included in step S220 in the control method of FIG. 6 according to some embodiments.

Referring to the embodiment shown in FIG. 8, step S221 determines if an automatic mode is enabled, and if yes, then proceed to step S229 to detect if the input video format is a stereoscopic image format according to an indication of the stereoscopic image information. In an embodiment, the stereoscopic image information includes an indication of the input video including left-eye image frames and right-eye image frames. Since an input video signal having stereoscopic image information will match with a corresponding stereoscopic glasses to enable a viewer's left and right eyes to sequentially receive images of a certain frequency (for example, 60 Hz for each of the left and right eyes images), this feature of the input video signal can be used to determine if the input video format is a stereoscopic image format. Viewing stereoscopic images has less need for displaying images in high resolution. Accordingly, if it is determined that the input video format is stereoscopic image format, the process proceeds to step S228 which switches the projection display apparatus 110 to the second operating mode 118. If the input video format is not in stereoscopic image format, the process proceeds to step S222 to determine if the resolution of the input video is greater than the first display resolution of the imaging device 112. This determination step and other manual mode steps are the same as the above described with reference to FIG. 7, and are not repeat herein.

Figure 9:
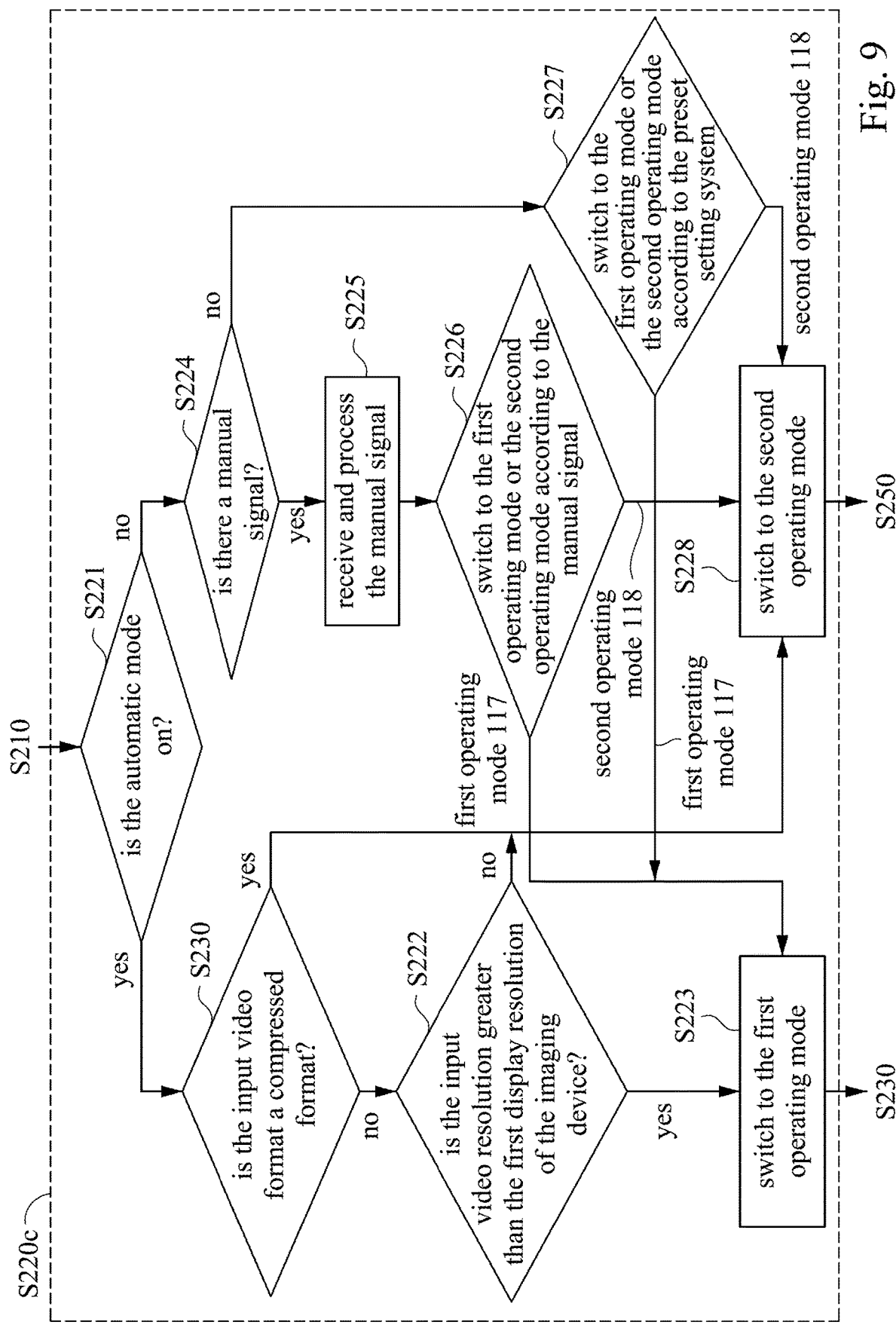
FIG. 9 is a flow chart of further steps included in step S220 in the control method of FIG. 6 according to some embodiments.

Referring to the embodiment shown in FIG. 9, step S221 determines if an automatic mode is enabled, and if yes, then proceed to step S230 to determine if the input video format is a compressed format. This determination can take into consideration one or more video compression rate parameter, such as compression ratio, compression type, and compression encryption. In general, the resolution of an image after compression is lower than its resolution before compression. Since a user that compresses an image usually utilizes it for the convenience of data transmission or convenience of use, it less likely that high image resolution is of concern. Accordingly, if the input video format is determined to be a compressed format, it is assumed that the first operating mode 117 (high resolution mode) is not applicable, and therefore the process proceeds to step S228 which switches the projection display apparatus 110 to the second operating mode 118. If the input video format is determined not to be a compressed format, the process proceeds to step S222 to determine if the resolution of the input video is greater than the first display resolution of the imaging device 112. This determination step and the other steps shown in the FIG. 9 are the same as previously described, and are not repeated herein.

Figure 10:
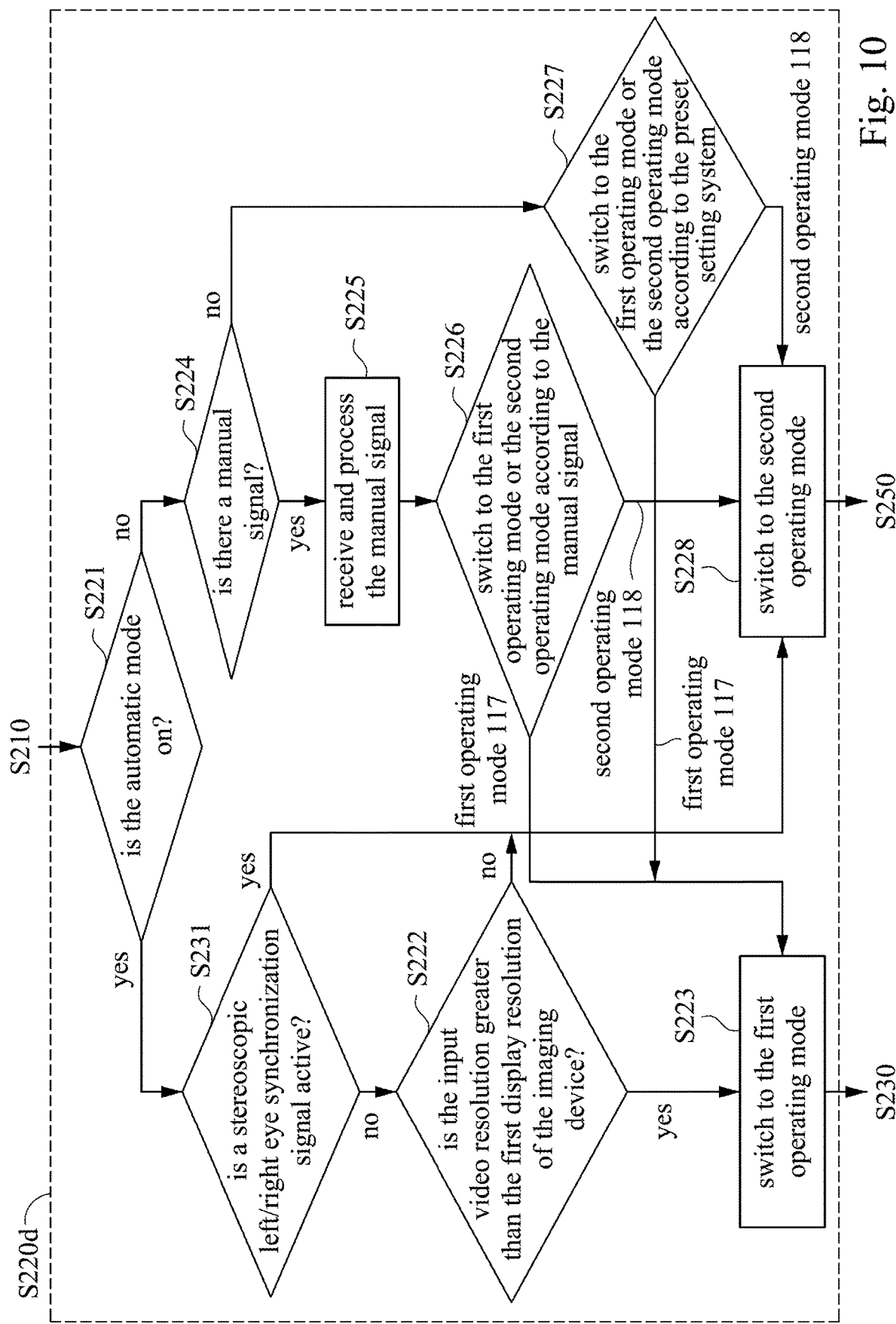
FIG. 10 is a flow chart of further steps included in step S220 in the control method of FIG. 6 according to some embodiments.

Referring to the embodiment shown in FIG. 10, step S221 determines if an automatic mode is enabled, and if yes, then proceed to step S231. When a user wears the stereoscopic glasses 120 for viewing images displayed by the projection display apparatus 110, the communication device 113 receives a wearing signal of the stereoscopic glasses 120 and transmits a stereoscopic left/right eye synchronization signal to the stereoscopic glasses 120. Step S231 detects if the stereoscopic left/right eye synchronization signal is active, and if yes, proceed to step S228. Similar to previously described determination step S230 of FIG. 8, if there is an indication that the stereoscopic image is to be viewed, so that it is assumed that the first operating mode 117 (high resolution mode) is not applicable, and the process proceed to S228 which switches the projection display apparatus 110 to the second operating mode 118. If it is determined that the stereoscopic left/right eye synchronization signal from the communication device 113 has been transmitted, the process proceed to step S222 to determine if the resolution of the input video is greater than the first display resolution of the imaging device 112. This determination step and the other steps shown in the FIG. 10 are the same as previously described, and are not repeated here.

Figure 11:
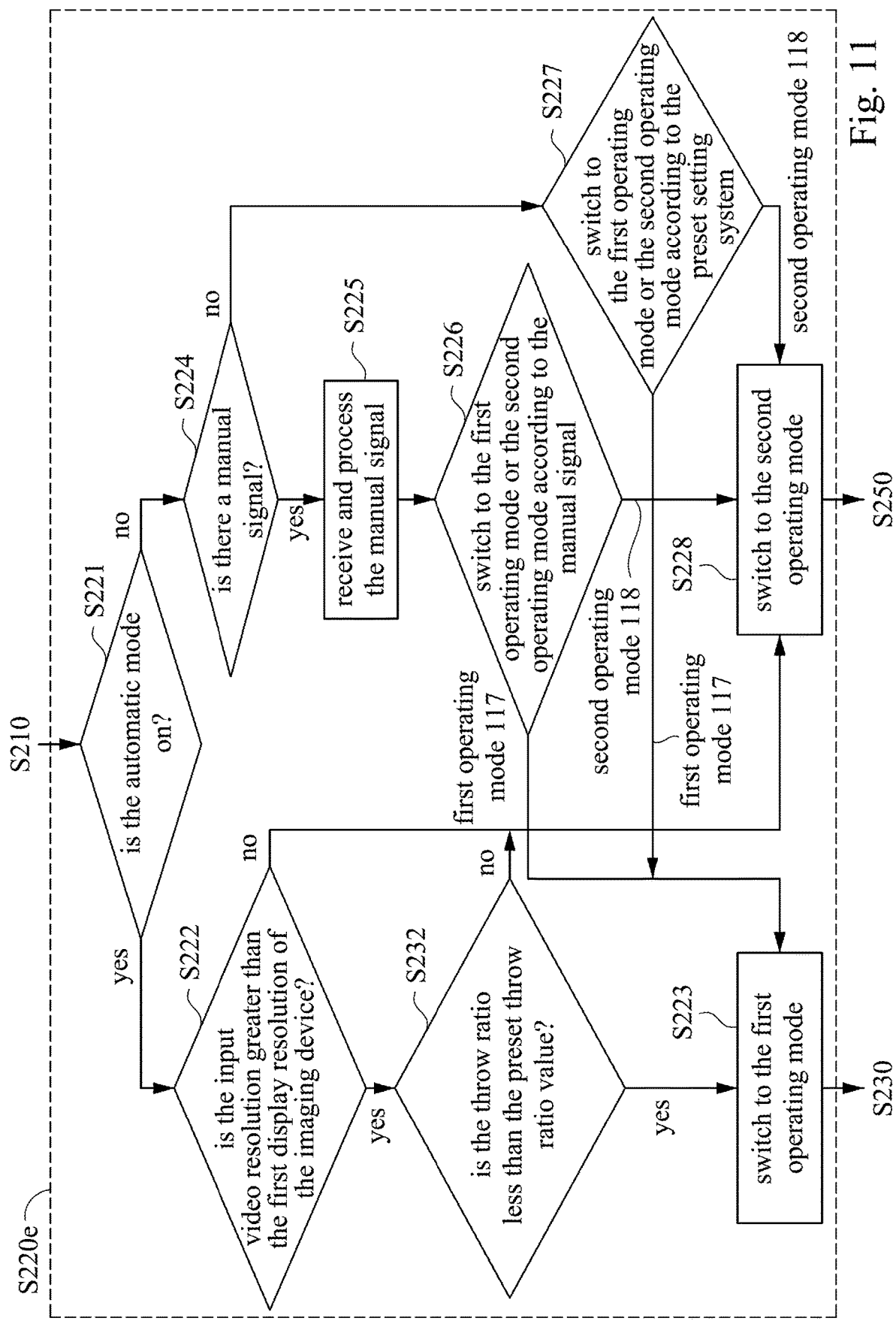
FIG. 11 is a flow chart of further steps included in step S220 in the control method of FIG. 6 according to some embodiments.

Referring to the embodiment shown in FIG. 11, step S221 determines if an automatic mode is enabled, and if yes, then proceed to step S222 to determine if the resolution of the input video is greater than the first display resolution of the imaging device 112. If the resolution of the input video is determined to be greater than the first display resolution of the imaging device 112, proceed to step S232 which determines if a throw ratio 119 of the projection display apparatus 110 is smaller than a preset throw ratio value. Throw ratio 119 is defined as a ratio (D/W), which is the distance (D) between the lens 116 and the screen 300, divided by the width (W) of the projection image 130. As previously described with reference to FIG. 1 and FIG. 2, the throw ratio 119 of the projection display apparatus 110 can be changed (e.g., by changing the lens 116, manually adjusted, or electrically adjusted). Accordingly, with different use of the projection display apparatus 110, its throw ratio 119 may be set differently compared to other uses. Comparatively, the preset throw ratio value of the projection display apparatus 110 is a fixed setting which when used for determination (further described herein), provides a threshold-type parameter for use to switch the operating modes of the projection display apparatus 110.

At step S232, if the throw ratio 119 is determined to be smaller than the preset throw ratio value, then proceed to step S223 to switch to the first operating mode 117. A small throw ratio may mean that the projection display apparatus 110 is using short focal length lens (for projecting a larger image over a relatively short distance). In this situation, a higher resolution may be desired, and therefore by switching the projection display apparatus 110 to the first operating mode 117 (high resolution mode), enhanced resolution images can be projected for viewing. Conversely, a larger throw ratio is likely to mean that high resolution is not required. Therefore, by comparing the projection display apparatus 110 throw ratio to a preset throw ratio value, a determination can be made as to which of the first operating mode 117 (high resolution mode) or the second operating mode 118 (high frame mode) is more suitable for use. For example, a setting could be made such that if the throw ratio 119 of the projection display apparatus 110 is not lower than the preset throw ratio value, step S228 proceeds to switch to the second operating mode 118. The other steps shown in the FIG. 11 are the same as previously described, and are not repeated herein.

Figure 12:
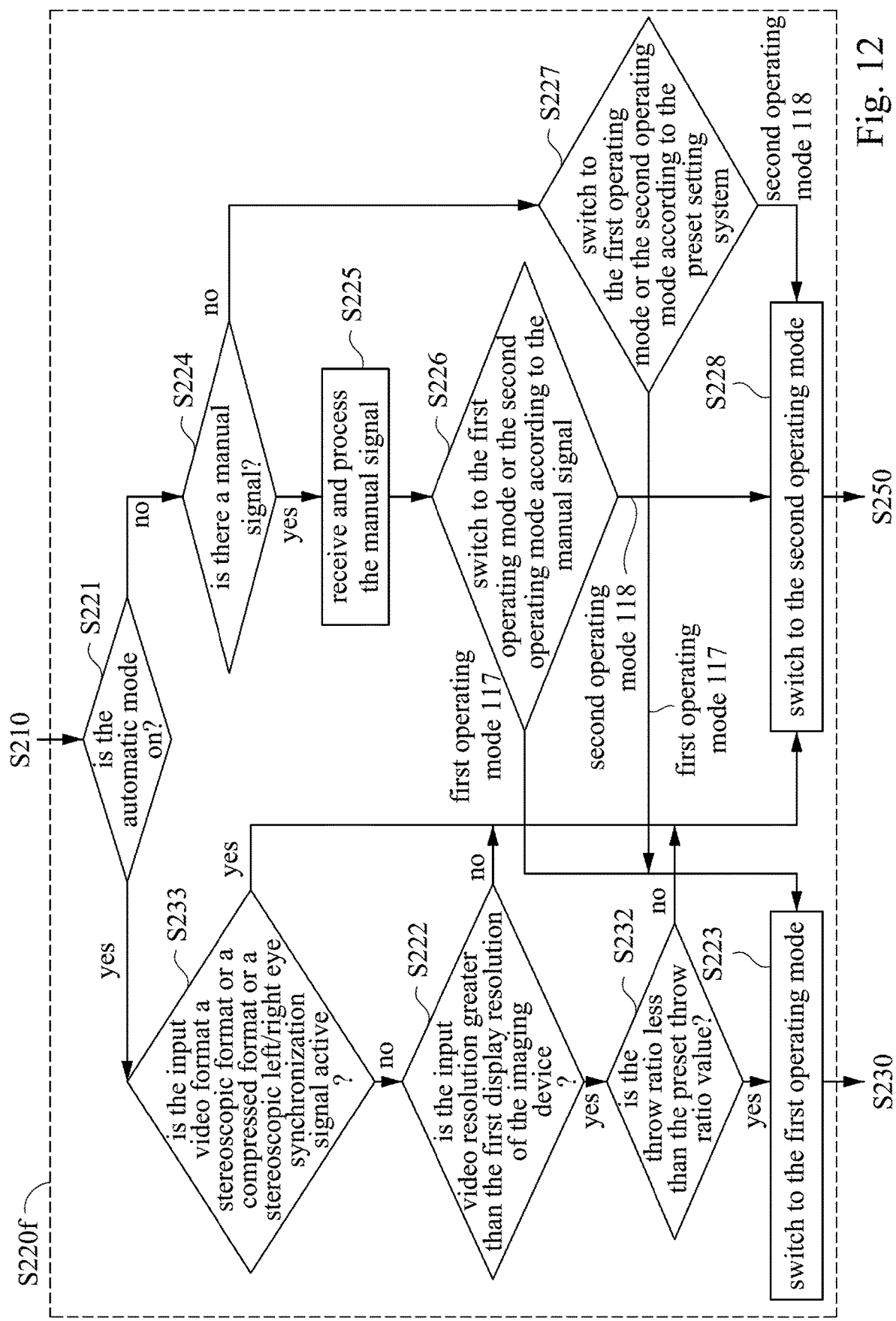
FIG. 12 is a flow chart of further steps included in step S220 in the control method of FIG. 6 according to some embodiments.

Referring to the embodiment shown in FIG. 12, step S221 determines if an automatic mode is enabled, and if yes, then proceed to step S233. At step S233, the input video feature and the operating condition previously described are assessed, including determining if the input video format is a stereoscopic image format or a compressed format, or if the stereoscopic glasses 120 has been worn (e.g. if the stereoscopic left/right eye synchronization signal is active). If any of these determinations is a "yes", then proceed to step S228 which switches the projection display apparatus 110 to the second operating mode 118. If all three determination results are "no", then proceed to step S222 to determine if the input video resolution is greater than the first display resolution of the imaging device 112. If the determination result is a "no", then proceed to step S228 to switch the projection display apparatus 110 to the second operating mode 118. If the determination result is a "yes", then proceed to step S232 to determine if the throw ratio 119 of the projection display apparatus 110 is smaller than a preset throw ratio value. If the determination result is a "yes" (i.e., the throw ratio 119 is smaller than the preset ratio value), then proceed to step S223 to switch the projection display apparatus 110 to the first operating mode 117. If determination result is a "no" (i.e., the throw ratio 119 is greater than the preset throw ratio value), then proceed to step S228 to switch the projection display apparatus 110 to the second operating mode 118. The other steps shown in the FIG. 12 are the same as previously described, and are not repeated herein.

The control method of the present disclosure that can be implemented is not limited to the above examples. The projection display apparatus 110 may determine to switch to the first operating mode 117 or the second operating mode 118 preferentially according to the input video feature or preferentially according to one or more operating conditions. Other than initial apparatus settings, a user can also set/change the priority order of which the projection display apparatus 110 undertakes determination to the switch to the first operating mode 117 or the second operating mode 118, according to various input video features and operating conditions.

Although the disclosure has been described in detail with reference to certain embodiments thereof, it will be understood that the embodiments are not intended to limit the disclosure. It will be apparent to those skilled in the art that various modifications and variations can be made to the structure of the present disclosure without departing from the scope of the disclosure. In view of the foregoing, it is intended that the present disclosure cover modifications and variations of this disclosure provided they fall within the scope of the following claims.

What is claimed is:

1. A projection display apparatus, comprising:
   a control circuit configured to control the projection display apparatus to operate in a first operating mode or a second operating mode according to an input video feature of an input video signal or an operating condition;
   a processing circuit configured to receive the input video signal, wherein in the first operating mode, the processing circuit converts the input video signal into a first output video signal, and wherein in the second operating mode, the processing circuit converts the input video signal into a second output video signal;
   an imaging device configured to transform the first output video signal into a plurality of output video sub-images each having a first display resolution, wherein the output video sub-images respectively correspond to a plurality of sets of pixel regions that are alternatingly arranged in the first output video signal;
   a shifting device cooperating with the imaging device to project the output video sub-images onto a screen at respective times in the first operating mode or to directly project a second output video image corresponding to the second output video signal onto the screen in the second operating mode, wherein the output video sub-images projected onto the screen are misaligned with respect to each other to form a first output video image with an output resolution greater than the first display resolution; and
   a communication device configured to couple to stereoscopic glasses, wherein the operating condition comprises the communication device transmitting a stereoscopic left/right eye synchronization signal to the stereoscopic glasses, wherein if the stereoscopic left/right eye synchronization signal is active, the control circuit switches the projection display apparatus to the second operating mode.

2. The projection display apparatus of claim 1, wherein the first operating mode is a high resolution mode, and the second operating mode is a high frame rate mode.

3. The projection display apparatus of claim 2, wherein in the high frame rate mode, the processing circuit converts the input video signal into the second output video signal with a frame rate greater than that of the input video signal.

4. The projection display apparatus of claim 2, wherein in the high resolution mode, the shifting device shifts each of the output video sub-images in a uniaxial or biaxial direction to project the output video sub-images onto the screen.

5. The projection display apparatus of claim 3, wherein the input video feature comprises an input video resolution, wherein:
   if the input video resolution is greater than the first display resolution, the control circuit switches the projection display apparatus to the high resolution mode; and
   if the input video resolution is not greater than the first display resolution, the control circuit switches the projection display apparatus to the high frame rate mode.

6. The projection display apparatus of claim 1, wherein the input video feature comprises:
   stereoscopic image information comprising an indication of the input video signal including left-eye image frames and right-eye image frames, wherein the control circuit switches the projection display apparatus to the second operating mode based on the stereoscopic image information.

7. The projection display apparatus of claim 1, wherein the input video feature comprises:
   a compression indicator comprising a video compression rate parameter, wherein the control circuit switches the projection display apparatus to the second operating mode based on the compression indicator.

8. The projection display apparatus of claim 1, further comprising:
   an adjustable lens, wherein the operating condition further comprises the projection display apparatus projecting an image according to a throw ratio corresponding to the adjustable lens, and wherein the control circuit switches the projection display apparatus to the first operating mode if the throw ratio is smaller than or equal to a preset throw ratio value.

9. A method for controlling a projection display apparatus, the method comprising:
   receiving, by a processing circuit, an input video signal comprising an input video feature;
   selectively switching, by a control circuit, the projection display apparatus to a first operating mode or a second operating mode according to the input video feature or an operating condition of the projection display apparatus, wherein the operating condition comprises a stereoscopic left/right eye synchronization signal transmitted to stereoscopic glasses by a communication device the of projection display apparatus, and wherein the projection display apparatus is switched to the second operating mode by the control circuit if the stereoscopic left/right eye synchronization signal is active;
   converting, by the processing circuit, the input video signal into a first output video signal if the projection display apparatus is switched to the first operating mode;
   converting, by the processing circuit, the input video signal into a second output video signal if the projection display apparatus is switched to the second operating mode;
   transforming, by an imaging device, the first output video signal into a plurality of output video sub-images each having a first display resolution, wherein the output video sub-images respectively correspond to a plurality of sets of pixel regions that are alternatingly arranged in the first output video signal;
   projecting, by a shifting device cooperating with the imaging device, the output video sub-images onto a screen at respective times in the first operating mode, wherein the output video sub-images projected onto the screen are misaligned with respect to each other to form a first output video image with an output resolution greater than the first display resolution; and
   directly projecting, by the shifting device cooperating with the imaging device, a second output video image corresponding to the second output video signal onto the screen in the second operating mode.

10. The method of claim 9, wherein the first operating mode is a high resolution mode, and the second operating mode is a high frame rate mode, wherein the method further comprises:
   converting, by the processing circuit, the input video signal into the second output video signal in the high frame rate mode, wherein the second output video signal has a frame rate greater than that of the input video signal.

11. The method of claim 10, further comprising:
   shifting, by the shifting device, each of the output video sub-images in a uniaxial or biaxial direction to project the output video sub-images onto the screen if the projection display apparatus is switched to the high frame rate mode.

12. The method of claim 10, wherein the input video feature comprises an input video resolution, and the method further comprises:
   determining, by the processing circuit, if the input video resolution is greater than the first display resolution, and if yes, switching the projection display apparatus, by the control circuit, to the high resolution mode; otherwise, switching the projection display apparatus, by the control circuit, to the high frame rate mode.

13. The method of claim 9, further comprising:
   switching, by the control circuit, the projection display apparatus to the second operating mode if the input video feature comprises stereoscopic image information indicating that the input video signal includes left-eye image frames and right-eye image frames.

14. The method of claim 9, further comprising:
   switching, by the control circuit, the projection display apparatus to the second operating mode if the input video feature comprises a compression indicator with a video compression rate parameter.

15. The method of claim 9, wherein the operating condition further comprises the projection display apparatus projecting an image based on a throw ratio thereof, and the method further comprises:
   switching, by the control circuit, the projection display apparatus to the first operating mode if the throw ratio is less than a preset throw ratio value.

16. The method of claim 10, wherein the input video feature comprises an input video resolution, and the operating condition is that the projection display apparatus projects an image based on a throw ratio thereof, wherein the method further comprises:
   switching, by the control circuit, the projection display apparatus to the high resolution mode if the input video resolution is greater than the first display resolution and the throw ratio is smaller than or equal to a preset throw ratio value.

17. The projection display apparatus of claim 1, wherein the shifting device is configured to shift the output video sub-images respectively in upper-right, upper-left, lower-right and lower-left directions relative to a non-shifted projection area of the screen.

18. The method of claim 9, wherein projecting the output video sub-images comprises:
   projecting the output video sub-images respectively in shifted projection areas of the screen shifting from a non-shifted projection area of the screen respectively in upper-right, upper-left, lower-right and lower-left directions.

* * * * *